(12) United States Patent
Ready

(10) Patent No.: US 8,720,656 B2
(45) Date of Patent: May 13, 2014

(54) COMBINATION ROLLING CART AND SUITCASE

(76) Inventor: Rosa Ready, San Francisco, CA (US)

( * ) Notice: Subject to any disclaimer, the term of this patent is extended or adjusted under 35 U.S.C. 154(b) by 125 days.

(21) Appl. No.: 13/569,931

(22) Filed: Aug. 8, 2012

(65) Prior Publication Data

US 2013/0037364 A1 Feb. 14, 2013

Related U.S. Application Data

(60) Provisional application No. 61/523,154, filed on Aug. 12, 2011.

(51) Int. Cl.
*A45C 5/14* (2006.01)
(52) U.S. Cl.
USPC ........ 190/18 A; 190/18 R; 190/107; 190/108; 190/111; 190/114; 122/127; 122/12 R; 122/13 R; 248/98; 280/47.131; 280/47.26
(58) Field of Classification Search
USPC ............. 190/18 A, 18 R, 107, 108, 111, 114; 122/127, 12 R, 13 R; 248/98; 280/47.131, 47.26
See application file for complete search history.

(56) References Cited

U.S. PATENT DOCUMENTS

| | | | | |
|---|---|---|---|---|
| 2,710,084 | A * | 6/1955 | Braverman | 190/107 |
| 2,806,563 | A * | 9/1957 | Einhorn | 190/107 |
| 4,813,520 | A * | 3/1989 | Lin | 190/107 |
| 5,242,189 | A * | 9/1993 | Osaki | 280/645 |
| 5,400,494 | A * | 3/1995 | Stilley | 29/434 |
| 5,607,129 | A * | 3/1997 | Kim | 248/98 |
| 6,131,713 | A * | 10/2000 | Sher | 190/122 |
| 7,896,143 | B2 * | 3/2011 | Lee | 190/107 |
| D649,320 | S * | 11/2011 | Renfrew et al. | D34/12 |
| 8,419,046 | B2 * | 4/2013 | Limontini | 280/640 |

* cited by examiner

*Primary Examiner* — Anthony Stashick
*Assistant Examiner* — Cynthia Collado
(74) *Attorney, Agent, or Firm* — Michael Ries

(57) ABSTRACT

The present invention is a combination rolling cart and suitcase that includes a base suitcase, an external support frame, a plurality of steel stabilizers, a plurality of permanent adjustable straps and plurality of attachment points where the attachment points receive and removably couple the permanent adjustable straps to secure one or more suitcases across a top portion of the combination rolling cart and suitcase. The combination rolling cart and suitcase also includes a pair of telescoping handles, a telescoping stem, a releasable handle lock, a plurality of omnidirectional casters and a lid releasably fastened to the base suitcase.

20 Claims, 5 Drawing Sheets

COMBINATION ROLLING CART AND SUITCASE

This application claims priority to U.S. Provisional Application 61/523,154 filed on Aug. 12, 2011, the entire disclosure of which is incorporated by reference.

TECHNICAL FIELD & BACKGROUND

Traveling through an airport with a suitcase has always been a cumbersome task. Often persons carrying a suitcase will utilize a rolling cart to facilitate transporting the suitcase by rolling the suitcase in contrast to carrying the suitcase. Traveling is even more cumbersome and complicated when having to carry more than one suitcase.

The present invention generally relates to a suitcase. More specifically, the invention is a combination rolling cart and suitcase for stacking and transporting one or more additional luggage items.

It is an object of the invention to provide a combination rolling cart and suitcase that saves time and money for travelers and eliminates having to rent a separate rolling cart at an airport.

It is an object of the invention to provide a combination rolling cart and suitcase that helps reduce stress and strain over carrying multiple heavy suitcases that is especially helpful to solo travelers, or travelers with babies or small children.

It is an object of the invention to provide a combination rolling cart and suitcase that is strong enough to carry another suitcase of equal weight when positioned horizontally.

It is an object of the invention to provide a combination rolling cart and suitcase that makes it easy to stack and transport several luggage items at the same time, with one hand.

It is an object of the invention to provide a combination rolling cart and suitcase that incorporates an ergonomic telescoping handle to set the handle at a comfortable angle.

It is an object of the invention to provide a combination rolling cart and suitcase that includes a handle that locks in place where a user can relatively easily and safely pull the combination rolling cart and suitcase with one hand, or push the combination rolling cart and suitcase with two hands using a pair of integrated handlebars.

What is really needed is a combination rolling cart and suitcase that saves time and money for travelers and eliminates having to rent a separate rolling cart at an airport that helps reduce stress and strain over carrying multiple heavy suitcases that is especially helpful to solo travelers, or travelers with babies or small children that is strong enough to carry another suitcase of equal weight when positioned horizontally that makes it easy to stack and transport several luggage items at the same time, with one hand that incorporates an ergonomic telescoping handle that includes a handle that locks in place where a user can relatively easily and safely pull the combination rolling cart and suitcase with one hand, or push the combination rolling cart and suitcase with two hands using a plurality of integrated handlebars.

BRIEF DESCRIPTION OF THE DRAWINGS

The present invention will be described by way of exemplary embodiments, but not limitations, illustrated in the accompanying drawing in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1A:
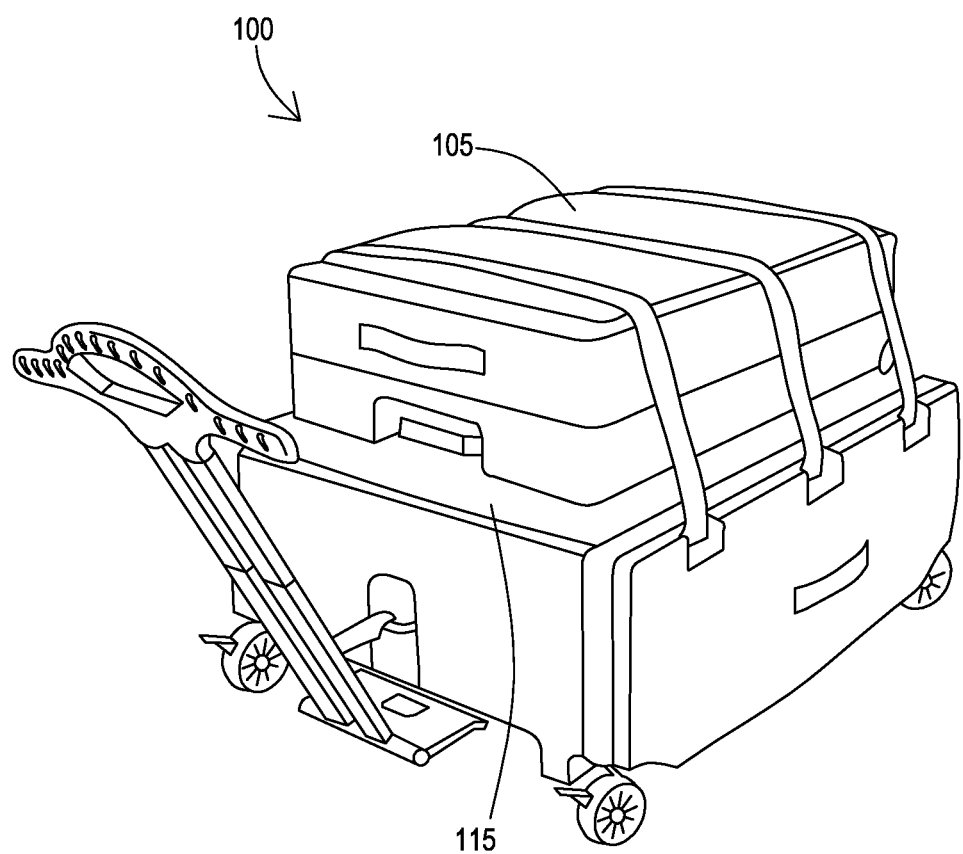
FIG. 1A illustrates a side environmental perspective view of a combination rolling cart and suitcase, in accordance with one embodiment of the present invention.

FIG. 1A illustrates a side environmental perspective view of a combination rolling cart and suitcase 100, in accordance with one embodiment of the present invention.

The combination rolling cart and suitcase 100 illustrated in FIG. 1A includes a suitcase 105 that is secured to a front facing 115 of the combination rolling cart and suitcase 100. The combination rolling cart and suitcase 100 can accommodate and secure the suitcase 105 or any other suitable piece of luggage or baggage to the front facing 115 of the combination rolling cart and suitcase 100. Additional details and features regarding the combination rolling cart and suitcase 100 are illustrated and described in subsequent FIGS. 1B, 2, 3, 4, 5, 6 and their descriptions.

Figure 1B:
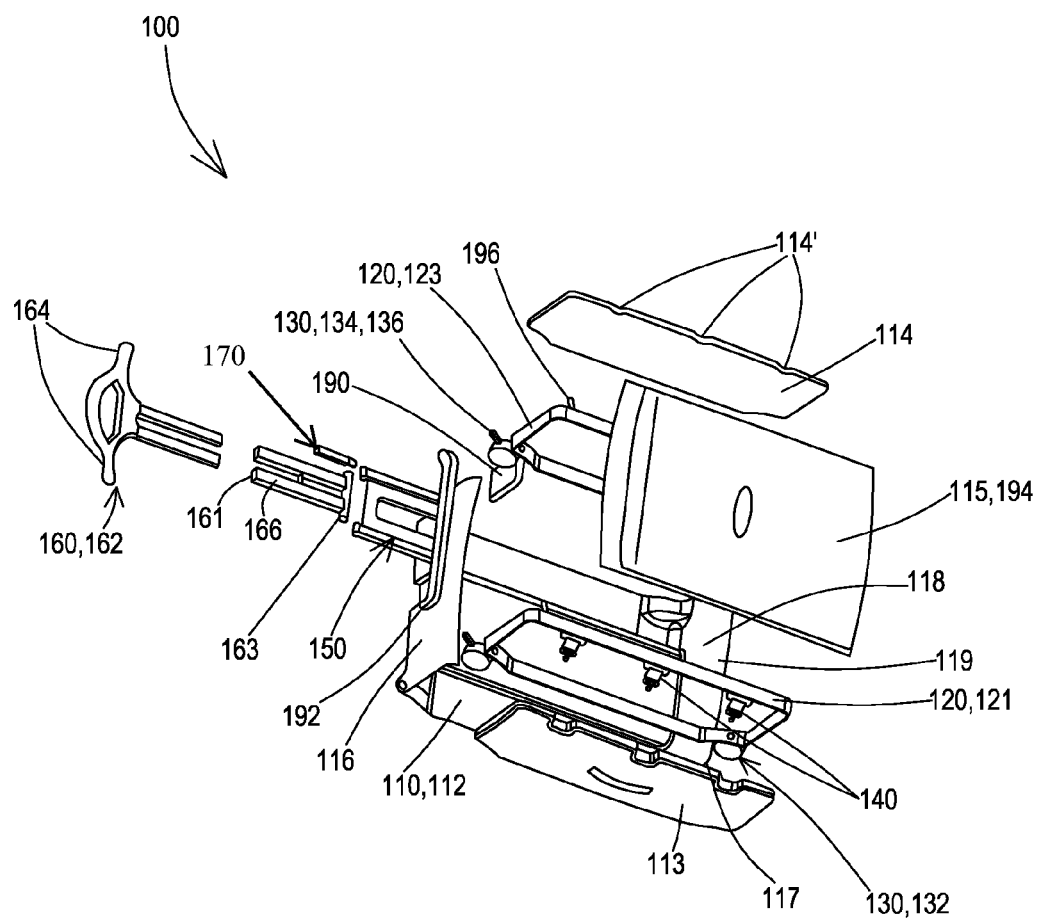
FIG. 1B illustrates an exploded top perspective view of a combination rolling cart and suitcase, in accordance with one embodiment of the present invention.

FIG. 1B illustrates an exploded top perspective view of a combination rolling cart and suitcase 100, in accordance with one embodiment of the present invention.

The combination rolling cart and suitcase 100 includes a base suitcase 110, a pair of support frames 120, a plurality of omnidirectional casters 130 and a plurality of permanent adjustable straps 140. The base suitcase 110 is a generally rectangular suitcase 112 with a first side 113 and a second side 114, a front facing 115, a top 116 and a bottom 118 with a front edge 119. The front facing 115 illustrated and described in FIG. 1B is similar to the front facing 115 illustrated and described in FIG. 1A. The top 116 of the base suitcase 110 accommodates a handle 111 disposed on the top 116 of the base suitcase 110 to allow a user to grasp the combination rolling cart and suitcase 100 if needed. The pair of support frames 120 include a first support frame 121 and a second support frame 123 that wrap vertically around the first side 113 and the second side 114 of the combination rolling cart and suitcase 100 to provide strength to the base suitcase 110 of the combination rolling cart and suitcase 100. Additional details regarding the first support frame 121 and the second support frame 123 are provided in FIGS. 2 and 3. The omnidirectional casters 130 are disposed on the bottom 118 and a plurality of corners 117 of the combination rolling cart and suitcase 100 and allow the combination rolling cart and suitcase 100 to roll on a ground surface while being transported. The omnidirectional casters 130 include two front omnidirectional casters 132 and two rear omnidirectional casters 134 that can all roll in a forward, a backward, a diagonal and a sideway direction. The rear omnidirectional casters 134 have steel stabilizers 136 that stabilize the combination rolling cart and suitcase 100 when stood upright to prevent the combination rolling cart and suitcase 100 from falling over. The permanent adjustable straps 140 are disposed on the first support frame 121 of the base suitcase 110 and extend through a plurality of top indentures 114' of the second side 114 of the combination rolling cart and suitcase 100. The permanent adjustable straps 140 secure one or more suitcases or any other suitable one or more pieces of luggage or baggage on the front facing 115 of the combination rolling cart and suitcase 100. The permanent adjustable straps 140 are made of nylon or any other suitable material. The permanent adjustable straps 140 are retractable and extend over the one or more suitcases 105 or any other suitable one or more pieces of luggage or baggage and across the front facing 115 of the combination rolling cart and suitcase 100. Additional details regarding the permanent adjustable straps 140 are illustrated and described in FIG. 4.

Additionally the combination rolling cart and suitcase 100 includes a sliding arm 150, a pair of telescoping handles 160, a releasable handle lock 170, and an arm housing 190. The sliding arm 150 extends from the top 116 of the base suitcase 110. The telescoping handles 160 include a secure handgrip 162 and a pair of handlebars 164 to allow a user to relatively easily grasp the pair of telescoping handles 160. The pair of telescoping handles 160 can be pushed or pulled by a user to transport the combination rolling cart and suitcase 100 and can move horizontally and extend outward to provide additional mobility and flexible movement to the combination rolling cart and suitcase 100. The telescoping handles 160 include a telescoping stem 166 with a first end 161 and a second end 163. The pair of telescoping handles 160 is adjustably attached to the first end 161 of the telescoping stem 166. A releasable handle lock 170 releasably locks the pair of telescoping handles 160 in a desired position and allows the combination rolling cart and suitcase 100 to be pulled behind or pushed forward. Additional details regarding the releasable handle lock 170 are illustrated and described in FIG. 6. The arm housing 190 is attached to the top 116 of the base suitcase 110 and is adjacent to a handle housing 192. The handle housing 192 houses the pair of telescoping handles 160, the telescoping stem 166 and the sliding arm 150.

Additionally, the combination rolling cart and suitcase 100 includes a lid 194. The lid 194 is releasably fastened to the front facing 115 of the base suitcase 110 with a zipper 196 or other suitable fastener such as a hook and loop fastener or a plurality of snaps (both not shown).

The combination rolling cart and suitcase comes in handy at an airport baggage claim for example. Even if the traveler knows they have a lot of luggage items to retrieve, they can easily:

1. Bypass the rolling-cart rental station and go straight to the carousel.
2. Position the combination rolling cart and suitcase horizontally on the ground as it rests on four omnidirectional casters (two of which lock).
3. Stack retrieved luggage items on top of the combination rolling cart and suitcase.
4. A permanent adjustable strap (comes with three) can be connected to an attachment point (also comes with three) to secure an additional stacked item.
5. Extend the telescoping handle, set the handle at the desired angle, than lock the telescoping handle in place.
6. Comfortably and safely pull the combination rolling cart and suitcase, like a wagon, through the airport with one hand. Or, if preferred, a user can push the combination rolling cart and suitcase forward with two hands, using the integrated handlebars.
7. When ready to leave the terminal, a user doesn't have to worry about dropping off, or abandoning, a rented rolling cart. The user can use their own suitcase to independently carry additional luggage pieces.

Figure 2:
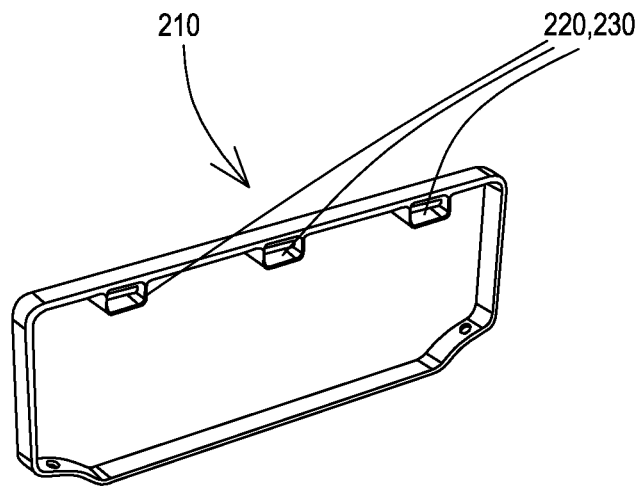
FIG. 2 illustrates a side view of a first support frame of a combination rolling cart and suitcase, in accordance with one embodiment of the present invention.

FIG. 2 illustrates a side view of a first support frame 210 of a combination rolling cart and suitcase 100, in accordance with one embodiment of the present invention. The combination rolling cart and suitcase 100 and the first support frame 210 illustrated and described in FIG. 2 are similar to the combination rolling cart and suitcase 100 and the first support frame 121 illustrated and described in FIG. 1B.

The first support frame 210 includes three relatively small housings 220 that contain three permanent adjustable straps 230, although the first support frame 210 can have 2, 4, 5 or any suitable number of relatively small housings 220 that can contain 2, 4, 5 or any suitable number of permanent adjustable straps 230. The permanent adjustable straps 230 illustrated and described in FIG. 2 are similar to the permanent adjustable straps 140 illustrated and described in FIG. 1B.

Figure 3:
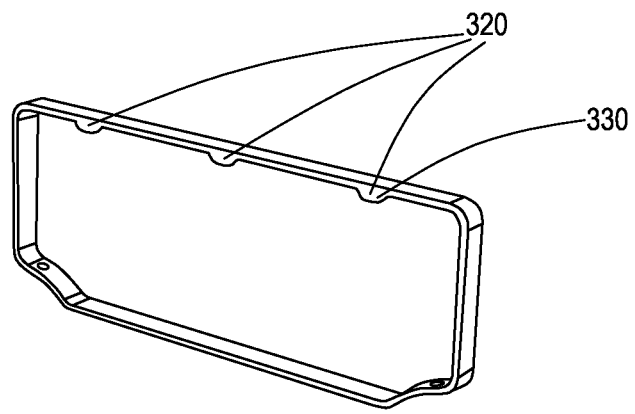
FIG. 3 illustrates a side view of a second support frame of a combination rolling cart and suitcase, in accordance with one embodiment of the present invention.

FIG. 3 illustrates a side view of a second support frame 310 of a combination rolling cart and suitcase 100, in accordance with one embodiment of the present invention. The combination rolling cart and suitcase 100 and the second support frame 310 illustrated and described in FIG. 3 are similar to the combination rolling cart and suitcase 100 and the second support frame 123 illustrated and described in FIG. 1B.

The second support frame 310 includes three relatively small housings 320 that each contains a horizontal bar 330 running across each of the three relatively small housings 320. The three relatively small housings 320 of the second support frame 310 are horizontally aligned with the three relatively small housings 220 of the first support frame 210.

Figure 4:
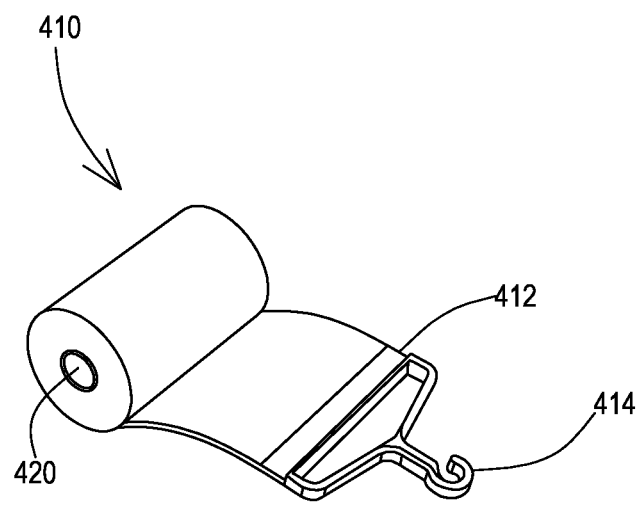
FIG. 4 illustrates a top view of a permanent adjustable strap of a combination rolling cart and suitcase, in accordance with one embodiment of the present invention.

FIG. 4 illustrates a top view of a permanent adjustable strap 410 of a combination rolling cart and suitcase 100, in accordance with one embodiment of the present invention. The combination rolling cart and suitcase 100 and permanent adjustable straps 410 illustrated and described in FIG. 4 are similar to the combination rolling cart and suitcase 100 and the permanent adjustable straps 140 illustrated and described in FIG. 1B.

The permanent adjustable straps 410 include a first end 412 with an extended hook 414 attached to the first end 412. The permanent adjustable straps 410 are extended across the front facing 115 of the base suitcase 110 and the extended hook 414 is releasably coupled to the horizontal bar 330 of the three relatively small housings 320 of the second support frame 310, thereby releasably securing one or more suitcases 105 or any other suitable piece of luggage or baggage on the front facing 115 of the base suitcase 110. The permanent adjustable straps 410 are also wrapped around a retractable wheel 420 that can retract the permanent adjustable straps 410 when the permanent adjustable straps 410 are uncoupled.

Figure 5:
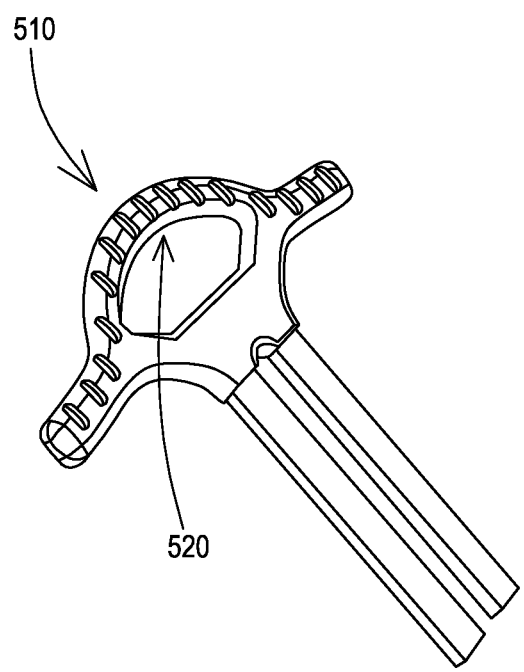
FIG. 5 illustrates a front view of a pair of telescoping handles of a combination rolling cart and suitcase, in accordance with one embodiment of the present invention.

FIG. 5 illustrates a front view of a pair of telescoping handles 510 of a combination rolling cart and suitcase 100, in accordance with one embodiment of the present invention. The combination rolling cart and suitcase 100 and the pair of telescoping handles 510 illustrated and described in FIG. 5 are similar to the combination rolling cart and suitcase 100 and the pair of telescoping handles 510 illustrated and described in FIG. 1B.

The pair of telescoping handles 510 includes a plurality of raised vertical lines 520 that facilitate a relatively stronger grasp of the pair of telescoping handles 510. The raised vertical lines 520 are disposed across the width of the pair of telescoping handles 510.

Figure 6:
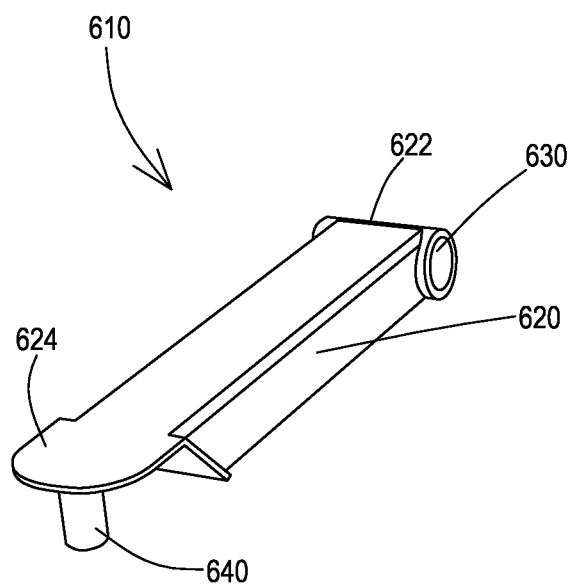
FIG. 6 illustrates a top view of a releasable handle lock of a combination rolling cart and suitcase, in accordance with one embodiment of the present invention.

FIG. 6 illustrates a top view of a releasable handle lock 610 of a combination rolling cart and suitcase 100, in accordance with one embodiment of the present invention.

The releasable handle lock 610 includes an elongated vertical base 620, an enclosed horizontal aperture 630 and an elongated attachment stem 640. The elongated vertical base 620 includes a first end 622 and a second end 624. The enclosed horizontal aperture 630 is disposed on the first end 622 of the elongated vertical base 620 and is movably and permanently attached to the telescoping stem 166 of the pair of telescoping handles 160. The elongated attachment stem 640 is disposed on the second end 624 of the elongated vertical base 620 and releasably couples to the arm housing 190 disposed on the top 116 of the base suitcase 110 to provide additional support to the combination rolling cart and suitcase 100.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A combination rolling cart and suitcase, comprising:
a base suitcase with a first side, a second side, a front facing, a top and a bottom, said bottom with a front edge and four corners;
a pair of support frames that include a first support frame and a second support frame, said pair of support frames are wrapped vertically around said first side and said second side of said base suitcase, said pair of support frames provides strength to said base suitcase of said combination rolling cart and suitcase;
a plurality of permanent adjustable straps that each include a first end and an extended hook, said extended hook is attached to said first end of said permanent adjustable straps, said permanent adjustable straps disposed on said first support frame, said permanent adjustable straps extend through a plurality of top indentures of said second side of said base suitcase, said first support frame includes three small housings that contain said permanent adjustable straps, said second support frame includes three small housings that each contain a horizontal bar running across said second support frame three small housings, said first support frame three small housings are horizontally aligned with said second support frame three small housings, said extended hook is releasably coupled to said horizontal bar of said three small housings of said second support frame, thereby releasably securing a selected one of one or more suitcases, one or more pieces of luggage and one or more pieces of baggage on said front facing of said base suitcase and said permanent adjustable straps are extended across said front facing of said base suitcase;
a pair of telescoping handles that include a telescoping stem, said telescoping stem with a first end and a second end, said pair of telescoping handles also include a secure handgrip and a pair of handlebars, said pair of handlebars allow a user to easily grasp said pair of telescoping handles;
a sliding arm that extends from said top of said base suitcase;
an arm housing attached to said top of said base suitcase, said arm housing is adjacent to a handle housing;
a releasable handle lock that releasably locks said pair of telescoping handles in a desired position;
a plurality of omnidirectional casters that include two front omnidirectional casters and two rear omnidirectional casters, said omnidirectional casters disposed on said bottom four corners of the combination rolling cart and suitcase, said omnidirectional casters allow said combination rolling cart and suitcase to roll on a ground surface while said combination rolling cart and suitcase is transported and said two rear omnidirectional casters each have a steel stabilizer that stabilize said combination rolling cart and suitcase when said combination rolling cart and suitcase is stood upright to prevent said combination rolling cart and suitcase from falling over; and
a lid releasably fastened to said front facing.

2. The combination rolling cart and suitcase according to claim 1, wherein said combination rolling cart and suitcase includes a handle disposed on said top of said base suitcase, said handle allows said user to grasp said combination rolling cart and suitcase.

3. The combination rolling cart and suitcase according to claim 1, wherein said permanent adjustable straps secure a selected one of one or more suitcases, one or more pieces of luggage and baggage on said front facing of said base suitcase.

4. The combination rolling cart and suitcase according to claim 3, wherein said permanent adjustable straps are retractable and extend over said one or more suitcases across said top portion of said combination rolling cart and suitcase.

5. The combination rolling cart and suitcase according to claim 1, wherein said permanent adjustable straps are wrapped around a retractable wheel that retracts said permanent adjustable straps.

6. The combination rolling cart and suitcase according to claim 1, wherein said pair of telescoping handles are pushed by said user to transport said combination rolling cart and suitcase.

7. The combination rolling cart and suitcase according to claim 1, wherein said pair of telescoping handles are pulled by said user to transport said combination rolling cart and suitcase.

8. The combination rolling cart and suitcase according to claim 1, wherein said pair of telescoping handles move horizontally and extend outward to provide additional mobility and flexible movement of said combination rolling cart and suitcase.

9. The combination rolling cart and suitcase according to claim 1, wherein said pair of telescoping handles is adjustably attached to said first end of said telescoping stem.

10. The combination rolling cart and suitcase according to claim 1, wherein said lid is fastened with a zipper.

11. A combination rolling cart and suitcase, comprising:
a base suitcase with a first side, a second side, a front facing, a top and a bottom, said bottom with a front edge and four corners;
a pair of support frames that include a first support frame and a second support frame, said pair of support frames are wrapped vertically around said first side and said second side of said base suitcase, said external support frame provides strength to said base suitcase of said combination rolling cart and suitcase;
a plurality of permanent adjustable straps that each include a first end and an extended hook, said extended hook is attached to said first end of said permanent adjustable straps, said permanent adjustable straps disposed on said first support frame, said permanent adjustable straps extend through a plurality of top indentures of said second side of said base suitcase, said first support frame includes three small housings that contain said permanent adjustable straps, said second support frame includes three small housings that each contain a horizontal bar running across said second support frame three small housings, said first support frame three small housings are horizontally aligned with said second support frame three small housings, said extended hook is releasably coupled to said horizontal bar of said three small housings of said second support frame, thereby releasably securing a selected one of one or more suitcases, one or more pieces of luggage and one or more pieces of baggage on said front facing of said base suitcase and said permanent adjustable straps are extended across said front facing of said base suitcase;
a pair of telescoping handles that include a telescoping stem, said telescoping stem with a first end and a second end, said pair of telescoping handles also include a secure handgrip and a pair of handlebars, said pair of handlebars allow a user to easily grasp said pair of telescoping handles;
a sliding arm that extends from said top of said base suitcase;
an arm housing attached to said top of said base suitcase, said arm housing is adjacent to a handle housing;
a releasable handle lock that includes an elongated vertical base, said elongated vertical base has a first end and a second end, and an enclosed horizontal aperture and an elongated attachment stem, said enclosed horizontal aperture is disposed on said first end of said elongated vertical base, said elongated attachment stem is disposed on said second end of said releasable handle lock, said elongated attachment stem releasably couples to said arm housing to provide additional support to said combination rolling cart and suitcase;
a plurality of omnidirectional casters that include two front omnidirectional casters and two rear omnidirectional casters, said omnidirectional casters disposed on said bottom four corners of the combination rolling cart and suitcase, said omnidirectional casters allow said combination rolling cart and suitcase to roll on a ground surface while said combination rolling cart and suitcase is transported and said two rear omnidirectional casters each have a steel stabilizer that stabilize said combination rolling cart and suitcase when said combination rolling cart and suitcase is stood upright to prevent said combination rolling cart and suitcase from falling over; and
a lid releasably fastened to said front facing, said lid is fastened with a zipper.

12. The combination rolling cart and suitcase according to claim 11, wherein said combination rolling cart and suitcase includes a handle disposed on said top of said base suitcase, said handle allows said user to grasp said combination rolling cart and suitcase.

13. The combination rolling cart and suitcase according to claim 11, wherein said permanent adjustable straps secure a selected one or more suitcases, one or more pieces of luggage and one or more pieces of baggage on said front facing of said base suitcase.

14. The combination rolling cart and suitcase according to claim 13, wherein said permanent adjustable straps are retractable and extend over said one or more suitcases across said top portion of said combination rolling cart and suitcase.

15. The combination rolling cart and suitcase according to claim 11, wherein said permanent adjustable straps are wrapped around a retractable wheel that retracts said permanent adjustable straps.

16. The combination rolling cart and suitcase according to claim 11, wherein said pair of telescoping handles are pushed by said user to transport said combination rolling cart and suitcase.

17. The combination rolling cart and suitcase according to claim 11, wherein said pair of telescoping handles are pulled by said user to transport said combination rolling cart and suitcase.

18. The combination rolling cart and suitcase according to claim 11, wherein said pair of telescoping handles move horizontally and extend outward to provide additional mobility and flexible movement of said combination rolling cart and suitcase.

19. The combination rolling cart and suitcase according to claim 11, wherein said pair of telescoping handles is adjustably attached to said first end of said telescoping stem.

20. The combination rolling cart and suitcase according to claim 11, wherein said handle housing houses said pair of telescoping handles, said telescoping stem and said sliding arm.

* * * * *